(12) United States Patent
Nordström

(10) Patent No.: US 6,263,079 B1
(45) Date of Patent: Jul. 17, 2001

(54) TELEPHONE WITH MEANS FOR ENHANCING THE LOW-FREQUENCY RESPONSE

(75) Inventor: Johan Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/265,862

(22) Filed: Mar. 11, 1999

(30) Foreign Application Priority Data

Mar. 19, 1998 (SE) .................................................. 9800909

(51) Int. Cl.⁷ ..................................................... H04M 1/00
(52) U.S. Cl. ............................................................. 379/433
(58) Field of Search .................................. 379/428, 433, 379/429, 420; 381/386, 392, 395, 189

(56) References Cited

U.S. PATENT DOCUMENTS 4,727,583    2/1988    Weber .

5,802,191  * 9/1998   Guenther ............................... 381/386

FOREIGN PATENT DOCUMENTS 41 17 598    12/1992   (DE) .
42 23 572    1/1994    (DE) .
0 582 404    2/1994    (EP) .

* cited by examiner

*Primary Examiner*—Jack Chiang
(74) *Attorney, Agent, or Firm*—Burns, Doane, Swecker & Mathis, L.L.P.

(57) ABSTRACT

A telephone has a loudspeaker mounted behind an earpiece portion of a housing, a center region of the earpiece portion having at least one central sound opening, through which sound generated by the loudspeaker is emitted. At least one bass sound opening is located in the housing remotely from the central sound opening, and devices are provided for generating sound with enhanced low-frequency characteristics through the bass sound opening.

8 Claims, 3 Drawing Sheets

TELEPHONE WITH MEANS FOR ENHANCING THE LOW-FREQUENCY RESPONSE

This application claims priority under 35 U.S.C. §§119 and/or 365 to 9800909-5 filed in Sweden on Mar. 19, 1998; the entire content of which is hereby incorporated by reference.

TECHNICAL FIELD

The present invention relates to telephones with means for enhancing the low frequency response and particularly telephones of the kind comprising a loudspeaker mounted behind an earpiece portion of a housing, a center region of the earpiece portion having at least one central sound opening, through which sound generated by the loudspeaker is emitted.

BACKGROUND

It is well-known in the technical field above that the sound quality of telephones is generally not always perfect. The main reason for this is the limited frequency response (between approximately 300 and 3400 Hz) of the telephone. The limits for the frequency response are specified in various approval regulations, which are mostly based on recommendations from the no longer existing CCITT (the International Telegraph and Telephone Consultative Committee), which used to be a committee of the ITU (International Telecommunications Union), which in turn is a United Nations treaty organization. In order to ensure repeatable measurements the recommended test methods make use of well-defined equipment, such as an artificial ear and mouth used for frequency response measurements.

According to a generally accepted test approach the frequency response of the loudspeaker in a telephone is measured by means of a test microphone coupled with an airtight seal directly over the loudspeaker. The test microphone is normally attached at the center of an earpiece portion of the telephone housing, i.e. immediately above the loudspeaker, which is located behind said earpiece portion. It is well within reach for manufacturers of state-of-the-art telephones to make the frequency response sufficiently flat and within the prescribed limits during testings with aforesaid air-tight seal between the loudspeaker and the microphone, so that the telephone may pass the tests.

However, since the tests prescribe an air-tight seal as described above, the frequency response of the loudspeaker will be less satisfactory, if even a very small gap exists between the loudspeaker and the microphone. In real life there is rarely a perfect seal between the loudspeaker and the ear of the user; on the contrary, the telephone will normally be kept at a small distance from the human ear. Particularly as regards mobile telephones, where the receiving loudness may be high and the level of noise may be considerable, the user will most probably put some distance between his ear and the loudspeaker of the telephone. The consequence of this is that the lower frequency region of the sound received through the loudspeaker will not exhibit the perfect loudness shown during test approvals; instead the sound amplitude at low frequencies will be considerably lower than for an ideal situation with a flat frequency response.

Previously known remedies for the problem above have involved boosting the low-frequency region of the sound emitted from the loudspeaker, wherein difficulties may arise in maintaining the overall frequency response of the telephone at a sufficiently flat level. Additionally, one obvious approach would be to provide an overall reduction in noise by using acoustical, electrical and electronic components of premium quality. However, this approach will imply a cost penalty to the total price for manufacturing the telephone.

SUMMARY

It is an object of the present invention to remedy the problem situation outlined above. In essence, the low-frequency response of a telephone may be enhanced thanks to the inventive realization that the losses at low frequencies may be corrected by means, which amplify the low-frequency region of the sound and emit the sound from locations separate from the central earpiece area, from which the sound from the loudspeaker is normally emitted and at which a test microphone will be coupled under air-tight seal during approval testings. In other words, according to the present invention the frequency response obtained at the center of the earpiece during testings is maintained at a flat level sufficient to pass the test, while the low frequencies of the sound (i.e. the bass sound) is amplified and emitted from non-central portions of the earpiece or telephone housing. Thanks to the invention the telephone will still pass approval tests, while a user will experience improved bass sound quality during normal use, wherein some distance is kept between the human ear and the telephone loudspeaker.

Hence, the object of the present invention is achieved for a telephone, comprising a loudspeaker mounted behind an earpiece portion of a housing, a center region of the earpiece portion having at least one central sound opening, through which sound generated by the loudspeaker is emitted, by providing at least one bass sound opening in the housing located remotely from the central sound opening and by providing means for generating sound with enhanced low-frequency characteristics through the bass sound opening.

Other objects, features and advantages of the present invention are described in the subsequent detailed disclosure, in the drawings as well as in the appended claims.

BRIEF DESCRIPTION OF THE DRAWINGS

Preferred embodiments of the present invention will now be described in more detail, reference being made to the accompanying drawings, in which.

DETAILED DESCRIPTION

Figure 1:
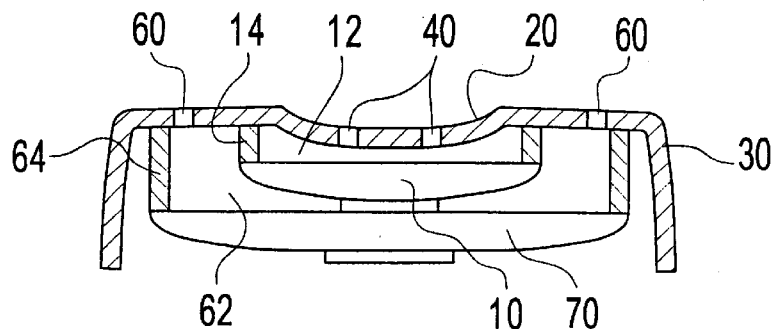
FIG. 1 is a schematic sectional view of a part of a telephone according to one embodiment of the present invention.

FIG. 1 illustrates a first embodiment of a telephone with means for enhancing the low-frequency response according to the present invention. The telephone comprises an apparatus housing 30 with an earpiece portion 20 provided with sound openings 40. A first speaker 10 is conventionally mounted inside the apparatus housing 30 behind the earpiece portion 20 in alignment with the sound openings 40. The first speaker 10 is designed to have a flat frequency response satisfying the approval regulations described above, where the frequency response is measured by means of a test microphone mounted with an air-tight seal to the earpiece portion 20. Furthermore, the telephone is provided with a second loudspeaker 70 mounted inside the apparatus housing 30 behind the first loudspeaker 10. The second loudspeaker 70 is arranged, as will be described below, to generate sound with enhanced low-frequency characteristics through bass sound openings 60 in the apparatus housing 30.

As seen in FIG. 1, the bass sound openings 60 are located remotely from the cental sound openings 40 at the center of the earpiece portion 20. Furthermore, the first loudspeaker 10 is provided with a first sound cavity 12 formed by a wall 14, whereas the second loudspeaker 70 has a second sound cavity 62 formed by a wall 64. The cavities 12 and 62 are acoustically isolated from each other.

Figure 2:
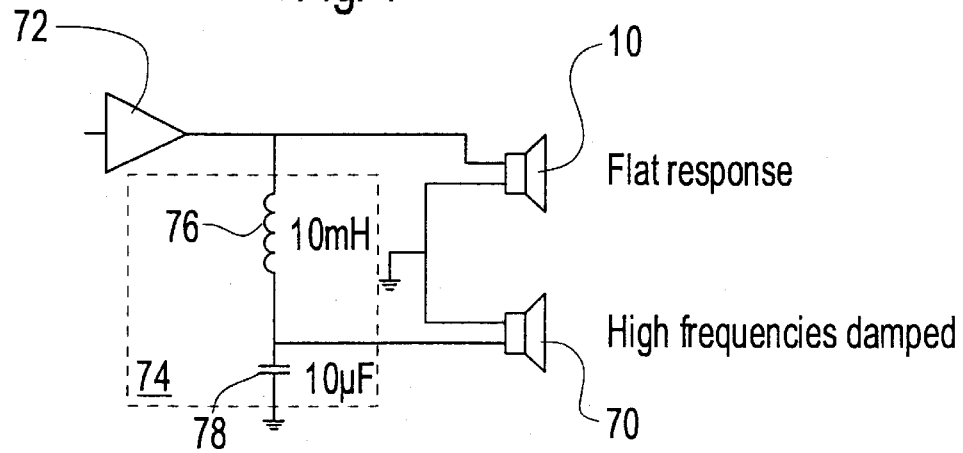
FIG. 2 is a schematic circuit diagram of the embodiment in FIG. 1.
Figure 4:
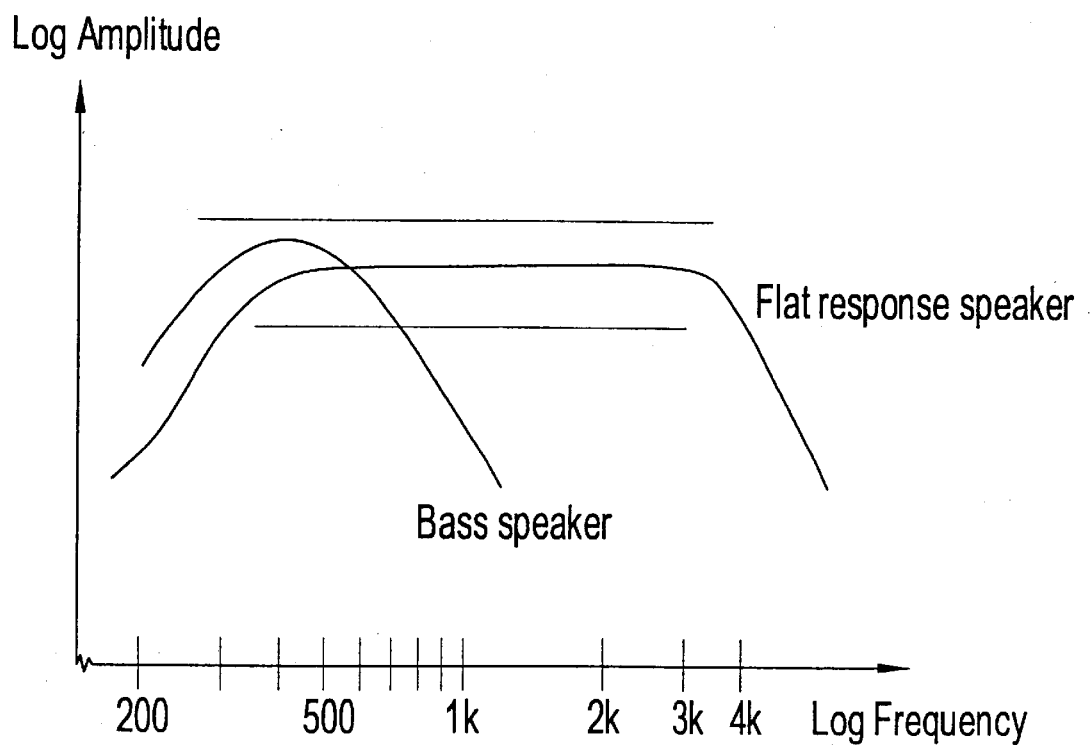

Both the first speaker 10, which will be referred to as the flat response speaker in the following, and the second speaker, which will be referred to as the bass speaker, in the following, are connected to a common amplifier 72. While the flat response speaker 10 is directly connected to this amplifier 72, thereby providing a flat frequency response as indicated in FIG. 4, the bass speaker 70 is connected to the amplifier 72 through an intermediate low-bass filter 74, which will damp the higher frequencies of the drive signal supplied to the bass speaker 70 and provide a frequency response mainly in a low-frequency region, as illustrated in FIG. 4. The low-pass filter 74 comprises a 10 mH coil 76 connected in series with a 10 $\mu$F capacitor 78, as illustrated in FIG. 2. Low-pass filters of this kind are well-known in the technical field and are not described in more detail hereinafter.

The bass speaker 70 is thus arranged to emit sound with enhanced bass or low-frequency characteristics through the non-central bass sound openings 60. The bass sound openings 60 are located sufficiently remote from the central sound openings 40 to make no influence on the above-mentioned approval test measurements, which are conducted at the center area of the earpiece portion 20. On the other hand, during normal use, the provision of enhanced bass sound through the bass sound openings 60 will improve the sound quality for a human user, as illustrated in FIG. 5.

Figure 5:
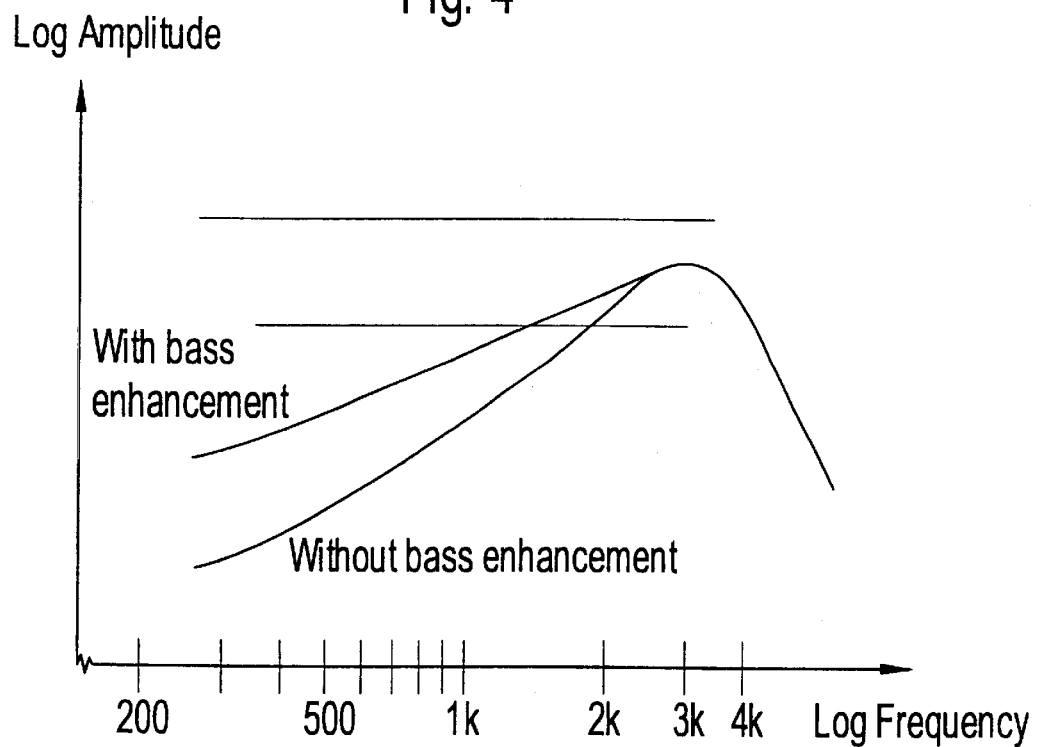

The lowest graph in FIG. 5 represents the sound quality obtained by a microphone, which is kept at a distance of 2 cm from the end of the telephone comprising the earpiece portion, when only the flat response speaker 10 is used (i.e., corresponding to a prior art telephone employing only one loudspeaker). The upper graph in FIG. 5 represents the sound quality measured by the same microphone located at the same distance from the telephone when using the double loudspeaker arrangement according to the first embodiment of the invention described above. As is clearly apparent from FIG. 5, the sound quality will be substantially improved in the low-frequency region thanks to the present invention.

Figure 3:
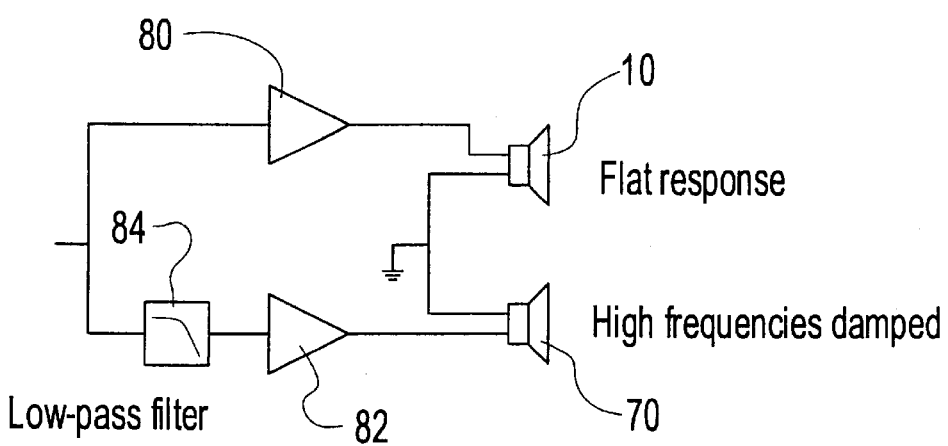
FIG. 3 is an alternative schematic circuit diagram for the embodiment in FIG. 1, FIGS. 4 and 5 are diagrams illustrating the frequency response of the embodiments in FIGS. 1–3.

As an alternative to the use of one common amplifier 72 for both loudspeakers 10 and 70 in FIG. 2, the flat response speaker 10 and the bass speaker 70 may be driven by a respective amplifier 80 and 82, as illustrated in FIG. 3. A low-pass filter 84 is connected prior to the second amplifier 82, so that only the lower frequencies will be amplified in the drive signal supplied to the bass speaker 70. The low-pass filter 84 may be realized by conventional passive components, such as resistors and capacitors, as will be appreciated by the skilled person. Alternatively, the low-pass filtering may be effected by a digital signal processor (DSP).

A second embodiment of the present invention will now be described with reference to FIGS. 6 and 7. The second embodiment will provide a more compact solution than the first embodiment, since the need for an extra bass speaker 70 has been eliminated. A schematic view of the second embodiment is given in FIG. 6. The telephone comprises an apparatus housing 30 with an earpiece portion 20 provided with central sound openings 40. A loudspeaker 10 is mounted inside the apparatus housing 30 behind the earpiece portion 20. Furthermore, the apparatus housing 30 is provided with bass sound openings 60 located at a distance from the central area of the earpiece portion 20 and the central sound openings 40. The elements described this far are identical or similar to the corresponding elements in the first embodiment described in FIG. 1.

Figure 6:
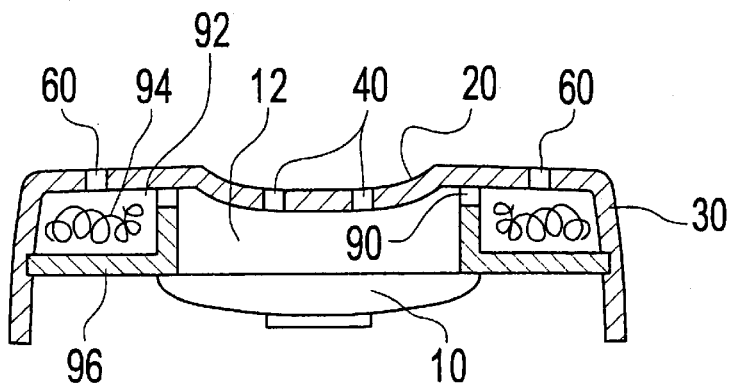
FIG. 6 is a schematic sectional view of a second embodiment of the present invention.

Unlike the first embodiment, the telephone of FIG. 6 has no additional bass speaker. Instead, bass chambers 92 are arranged on either sides of a central sound cavity 12. The bass chambers 92 are formed by walls 96 and are connected to a respective bass sound opening 60. Furthermore, each bass chamber 92 is connected to the central sound cavity 12 through a small opening 90 in the wall 96. Additionally, each bass chamber 92 contains acoustically damping material 94 arranged to filter out high-frequency components in the sound leaked from the central sound cavity 12 through the openings 90 to the respective bass chamber 92.

The single loudspeaker 10 is driven by amplifying means, such as an amplifier and filters, so that the low-frequency region of the sound emitted from the loudspeaker 10 is amplified. Such a boost of the low-frequency region might appear to contravene the requirements for a flat frequency response of the sound detected by a test microphone through the central sound openings 40. However, a certain amount of the sound generated by the loudspeaker 10 in the central sound cavity 12 will leak through the openings 90 into the bass chambers 92. The higher frequency regions of this sound will be damped by the damping material 94 as well as by the openings 90 themselves, but a certain amount of the lower frequencies will be emitted through the bass sound openings 60, thereby enhancing the bass portion of the total sound received by a human ear located at some distance from the earpiece portion 20.

In order to obtain both a sufficiently flat frequency response when measuring with an air-tight seal directly over the central sound openings 40 as well as the desired bass enhancement when listening during normal use of the telephone, the central sound cavity 12 as well as the bass chambers 92, the openings 90 and 60 and the acoustically damping material 94 will have to be carefully designed and adjusted during real-life and laboratory tests. It is regarded to be well within reach for the skilled person to carry out such tuning, given the basic guidelines described above.

Figure 7:
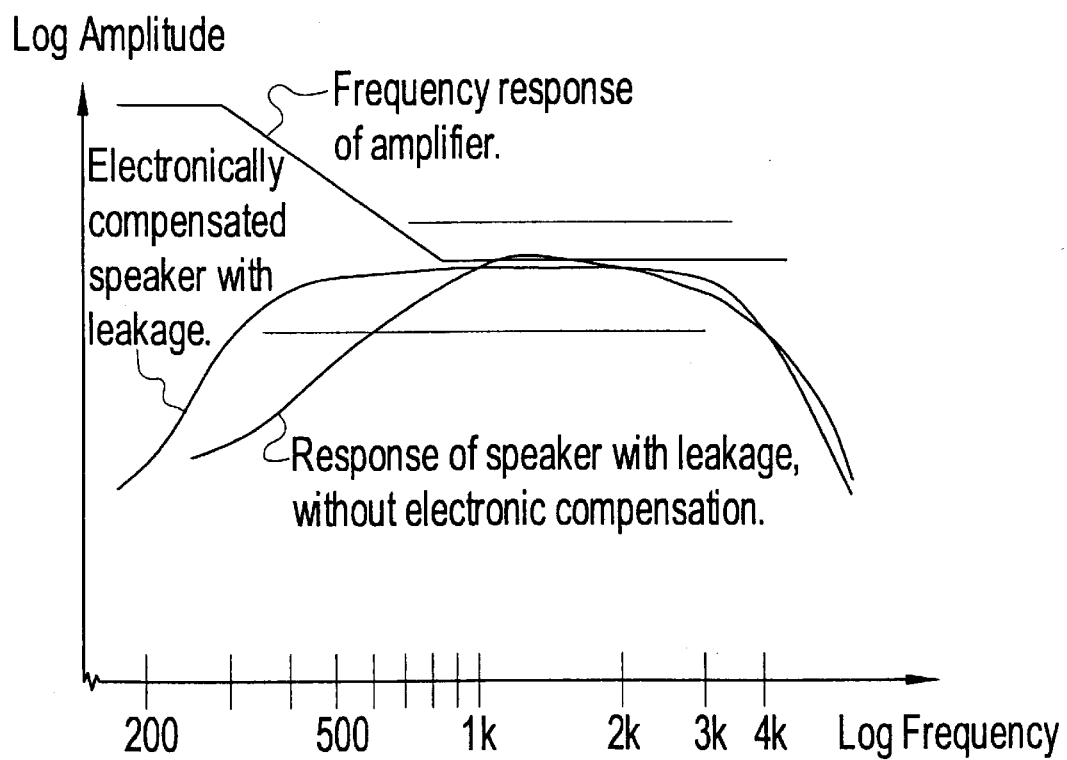
FIG. 7 is a diagram illustrating the frequency response of the embodiment shown in FIG. 6.

The frequency response of the second embodiment, as measured with a test microphone tightly engaging the earpiece portion 20, is illustrated in FIG. 7. The lowest graph represents the frequency response of the speaker 10, if no amplification or electronic compensation of the low-frequency losses is made. The uppermost graph represents the frequency response of the amplifier used for improving the bass sound characteristics. As seen in FIG. 7, the amplifier is arranged to provide a high level of amplification for frequencies up to around 300 Hz and a linearity decreasing amplification for frequencies between approximately 300 and 900 Hz. For frequencies above 900 Hz the amplifier provides a low level of amplification. The resulting frequency response of the loudspeaker 10 is illustrated by the intermediate graph, which shows that the total sound quality obtained by the second embodiment of the invention exhibits a sufficiently flat frequency response.

The resulting frequency response obtained during normal use corresponds essentially to the frequency response illustrated in FIG. 5 for the first embodiment.

The present invention has been described above with reference to a first and a second embodiment. However, embodiments other than the ones explicitly disclosed are possible within the scope of the invention, as defined by the appended independent claim. For instance, as regards the first embodiment, the two loudspeakers may alternatively be arranged next to each other rather than behind each other. Furthermore, all amplifying and filtering functions may be effected by other means than the ones disclosed. In addition, both the central sound openings and the remote bass sound openings may be arranged differently and may have a number more or less than what is illustrated in the drawings and the preceding description. As regards the second embodiment (FIG. 6), the use of an acoustically damping material 94 may be avoided by carefully designing the acoustic properties of the bass sound cavities 92 and the openings 90 and 60.

What is claimed is:

1. A telephone having an earpiece portion of a housing, the housing comprising:

a loudspeaker mounted within the housing to generate sound forward into a portion of the housing defining a central chamber, said defined central chamber having at least one central sound aperture to emit the sound externally;

a portion of the housing defining at least one bass chamber adjacent to the defined central chamber, wherein the defined at least one bass chamber includes apertures to receive sound from the defined central chamber, means to enhance the low-frequency characteristics of the received sound and at least one bass sound aperture to emit the low-frequency enhanced sound externally; and a portion of the housing behind the loudspeaker defining an outer chamber.

2. The telephone of claim 1, wherein the means to enhance the low-frequency characteristics includes acoustically damping material.

3. An earpiece housing in a telephone, comprising:

an outer chamber within the earpiece housing and defined by outermost walls of the earpiece housing;

a bass chamber within the earpiece housing and defined by a first loudspeaker, an outer wall and at least one first side wall, said outer wall having at least one bass sound aperture to emit low frequency enhanced sound externally from the first loudspeaker;

a central chamber within the bass chamber and defined by a second loudspeaker, an outer wall, the at least one first side wall, the first loudspeaker and at least one second side wall, said outer wall having at least one central sound aperture to emit a flat frequency response sound externally from the second loudspeaker; and means for generating the flat frequency response sound and the low frequency enhanced sound.

4. The earpiece housing of claim 3, wherein the means for generating the flat frequency response sound and the low frequency enhanced sound comprises at least one amplifier and a low pass filter.

5. An earpiece housing in a telephone, comprising:

an outer chamber defined by a portion of the earpiece housing;

a central chamber within the earpiece housing and defined by a loudspeaker, an outer wall, at least one side wall, said outer wall having at least one central sound aperture to emit a flat frequency response sound externally from the second loudspeaker;

at least one bass chamber within the earpiece housing, each bass chamber being defined by the at least one side wall, a rear wall and the outer wall, said at least one side wall having apertures to receive the flat frequency response sound from the central chamber and said outer wall having at least one bass sound aperture to emit a low frequency enhanced sound converted from the received flat frequency response sound externally; and means for converting the flat frequency response sound into the low frequency enhanced sound.

6. The earpiece housing of claim 5, wherein the means for converting the flat frequency response sound into the low frequency enhanced sound includes acoustically damping material.

7. A telephone having an earpiece portion of a housing, the housing comprising:

an outer chamber within the earpiece housing and defined by outermost walls of the earpiece housing;

a bass chamber within the earpiece housing and defined by a first loudspeaker, an outer wall and at least one first side wall, said outer wall having at least one bass sound aperture to emit low frequency enhanced sound externally from the first loudspeaker;

a central chamber within the bass chamber and defined by a second loudspeaker, an outer wall, the at least one first side wall, the first loudspeaker and at least one second side wall, said outer wall having at least one central sound aperture to emit a flat frequency response sound externally from the second loudspeaker; and means for generating the flat frequency response sound and the low frequency enhanced sound.

8. The telephone of claim 7, wherein the means for generating the flat frequency response sound and the low frequency enhanced sound comprises at least one amplifier and a low pass filter.

* * * * *